United States Patent
Lee et al.

(10) Patent No.: US 8,692,957 B2
(45) Date of Patent: Apr. 8, 2014

(54) SCANNING BACKLIGHT UNIT AND LIQUID CRYSTAL DISPLAY HAVING THE SAME

(75) Inventors: Dae-hee Lee, Hwaseong-si (KR);
Hyeong-sik Choi, Hwaseong-si (KR);
Myung-ryul Jung, Hwaseong-si (KR);
Do-hyeon Baek, Yongin-si (KR);
Sin-wook Hyung, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 13/327,360

(22) Filed: Dec. 15, 2011

(65) Prior Publication Data

US 2012/0182500 A1 Jul. 19, 2012

(30) Foreign Application Priority Data

Jan. 17, 2011 (KR) .................. 10-2011-0004474

(51) Int. Cl.
*G02F 1/1335* (2006.01)

(52) U.S. Cl.
USPC ................. 349/67; 349/65; 349/64; 362/621; 362/624; 362/97.2; 359/831

(58) Field of Classification Search
USPC ............... 349/61–67; 362/621, 624, 97.2; 359/831
See application file for complete search history.

(56) References Cited

U.S. PATENT DOCUMENTS

| | | | | |
|---|---|---|---|---|
| 6,633,722 B1* | 10/2003 | Kohara et al. | ................ | 385/146 |
| 7,077,556 B2* | 7/2006 | Sugiura | ................ | 362/623 |
| 7,458,712 B2* | 12/2008 | Joo et al. | ................ | 362/623 |
| 2003/0142247 A1* | 7/2003 | Nishiyama et al. | ............. | 349/67 |
| 2003/0174492 A1 | 9/2003 | Ohkawa | | |
| 2004/0061959 A1* | 4/2004 | Kim | ................ | 359/831 |
| 2004/0114067 A1* | 6/2004 | Kubomura et al. | ............. | 349/62 |
| 2005/0140847 A1 | 6/2005 | Jeon | | |
| 2005/0231982 A1* | 10/2005 | Kajiura | ................ | 362/625 |
| 2008/0259644 A1 | 10/2008 | Ohmori | | |
| 2008/0297695 A1 | 12/2008 | Sekiguchi et al. | | |
| 2009/0059621 A1 | 3/2009 | Takahashi et al. | | |
| 2009/0190069 A1* | 7/2009 | Dejima et al. | ................ | 349/65 |
| 2010/0110338 A1* | 5/2010 | Chang et al. | ................ | 349/65 |
| 2010/0142223 A1 | 6/2010 | Suckling et al. | | |
| 2010/0195019 A1* | 8/2010 | Shinohara et al. | ............. | 349/62 |
| 2010/0296021 A1* | 11/2010 | Jung et al. | ................ | 349/58 |
| 2010/0328570 A1* | 12/2010 | Kim et al. | ................ | 349/58 |
| 2011/0090427 A1* | 4/2011 | Ohue et al. | ................ | 349/65 |
| 2011/0170036 A1* | 7/2011 | Ishikawa et al. | ............. | 349/65 |

FOREIGN PATENT DOCUMENTS

| | | |
|---|---|---|
| JP | 11-174439 A | 7/1999 |
| WO | 2008/045681 A1 | 4/2008 |

OTHER PUBLICATIONS

Communication from the European Patent Office issued Apr. 24, 2012 in counterpart European Application No. 11187396.4.

* cited by examiner

*Primary Examiner* — Edward Glick
*Assistant Examiner* — Sang V Nguyen
(74) *Attorney, Agent, or Firm* — Sughrue Mion, PLLC

(57) ABSTRACT

A scanning backlight unit, a liquid crystal display and television and a television are provided herein. The backlight unit including a light source unit having plural groups of light sources which emit light in a main incidence direction; a control unit which controls the plural groups of light sources; and a light guiding plate having a bottom surface formed with a dispersion pattern dispersing the light received from the light source unit, wherein the dispersion pattern includes a plurality of grooves, with a groove of the plurality of grooves having a shape with a first size parallel to the main incidence direction and a second size perpendicular to the main incidence direction, and wherein the first size is larger than the second size.

17 Claims, 9 Drawing Sheets

SCANNING BACKLIGHT UNIT AND LIQUID CRYSTAL DISPLAY HAVING THE SAME

CROSS-REFERENCE TO RELATED APPLICATIONS

This application claims priority under 35 U.S.C. §119 from Korean Patent Application No. 10-2011-0004474, filed on Jan. 17, 2011, in the Korean Intellectual Property Office, the disclosure of which is incorporated herein by reference in its entirety.

BACKGROUND

1. Field of the Invention

Apparatuses and methods consistent with exemplary embodiments relate to a backlight unit used in a liquid crystal display, and more particularly, to a scanning backlight unit.

2. Description of the Related Art

A liquid crystal display is a display apparatus and is widely used owing to its property of reducing weight, miniaturization, full color, and high resolution. A liquid crystal panel which is used in the liquid crystal display reveals images by using a liquid crystal and a light receiving element, which is unable to emit light by itself. Accordingly, a backlight unit which supplies the light to the liquid crystal panel is required.

The backlight unit may be classified into an edge-lit backlight unit which requires a light guiding plate and a direct-lit backlight unit which does not require a light guiding plate. The edge-lit backlight unit for which the light source is mounted at one side of the light guiding plate may thin the liquid crystal display and thus is widely used recently.

In general, once a power source is applied to the liquid crystal display, the backlight unit is activated in a hold type which keeps the on-state at all times. However, if this kind of the backlight unit is used, motion blur may occur when the liquid crystal display replays the video images.

A scanning backlight technique has been disclosed as one of the methods to prevent motion blur, and the backlight unit which is applied to the scanning backlight technique is calls as a scanning backlight unit. In the scanning backlight technique, the backlight unit is divided into plural sections and each section repeats an on state (i.e., a state of supplying the light to the liquid crystal panel) and an off state (i.e., a state of not supplying the light to the liquid crystal panel) consecutively. For example, in a certain time, the first section of the backlight unit may be in an on state and the remaining sections of the backlight unit may be in an off state and, in the next time, the second section of the backlight unit may be in an on state and the remaining sections of the backlight may be in an off state. By the consecution of this process, the motion blur may be prevented.

If the first section of the backlight unit is in an on state, it is preferable that only the first section of the backlight unit supplies the light to the liquid crystal panel and the remaining sections of the backlight unit should not supply the light to the liquid crystal panel. However, in the edge-lit backlight unit where a light guiding plate is used, the light in the first section of the backlight unit is spread to the other section of the backlight unit due to the dispersion phenomenon in the light guiding plate. Accordingly, the other section of the backlight unit partially supplies the light to the liquid crystal panel. In this case, crosstalk may occur on the images which are reproduced by the liquid crystal display. Therefore, a technique which may prevent such crosstalk is needed.

SUMMARY

Exemplary embodiments of the present inventive concept address at least the above problems and/or disadvantages and other disadvantages not described above. Also, the present invention is not required to overcome the disadvantages described above, and an exemplary embodiment of the present invention may not overcome any of the problems described above.

According to an aspect of an exemplary embodiment, there is provided a scanning backlight unit which may include: a first light source unit having plural groups of first light sources which generate light independently; a control unit which controls the plural groups of the first light sources; and a light guiding plate which transmits the light generated from the first light source unit to a liquid crystal panel, wherein the light guiding plate comprises a first side which receives the light generated by the first light source unit, a bottom surface which is formed with a dispersion pattern dispersing the light received from the first side, and a top surface which transmits the light towards the liquid crystal panel, wherein the top surface of the light guiding plate comprises a lenticular lens having a length which is parallel to a main incidence direction of the light generated by the first light source unit, wherein the dispersion pattern comprises a plurality of grooves, with a groove of the plurality of grooves having a shape with a first size which is parallel to the main incidence direction of the first light source unit and a second size which is perpendicular to the main incidence direction of the first light source unit, and wherein the first size is larger than the second size.

A ratio of a depth of the groove to the second size of the groove may be at least 0.8.

A depth of the groove may be at least 90 μm.

A portion of the groove may be in an oval shape having a major axis parallel to the main incidence direction of the first light source unit and a minor axis perpendicular to the main incidence direction of the first light source unit.

The first light sources of the first light source unit may include a first plurality of light emitting diodes.

A length of the first side of the light guiding plate may be shorter than a length of a second side of the light guiding plate adjacent to the first side.

A distribution density of grooves among the plurality of grooves may increase with distance from the first light source unit.

The groove may be formed by a laser.

The backlight unit may further include a second light source unit, which is at an opposite side of the first light source unit, and which has plural groups of second light sources which generate light independently.

The second light source unit may include a second plurality of light emitting diodes.

A distribution density of grooves among the plurality of grooves may increase with distance from the first light source unit and the second light source unit.

According to another aspect of an exemplary embodiment, there is provided a liquid crystal display which may include a scanning backlight unit including: a first light source unit having plural groups of first light sources which generate light independently; a control unit which controls the plural groups of the first light sources; and a light guiding plate which transmits the light generated from the first light source unit to a liquid crystal panel, wherein the light guiding plate comprises a first side which receives the light generated by the first light source unit, a bottom surface which is formed with a dispersion pattern dispersing the light received from the first side, and a top surface which transmits the light towards the liquid crystal panel, wherein the top surface of the light guiding plate comprises a lenticular lens having a length which is parallel to a main incidence direction of the light generated by the first light source unit, wherein the dispersion pattern comprises a plurality of grooves, with a groove of the plurality of grooves having a shape with a first size which is parallel to the main incidence direction of the first light source unit and a second size which is perpendicular to the main incidence direction of the first light source unit, and wherein the first size is larger than the second size.

According to another aspect of an exemplary embodiment, there is provided a television which may include a liquid crystal display which may include a scanning backlight unit including: a first light source unit having plural groups of first light sources which generate light independently; a control unit which controls the plural groups of the first light sources; and a light guiding plate which transmits the light generated from the first light source unit to a liquid crystal panel, wherein the light guiding plate comprises a first side which receives the light generated by the first light source unit, a bottom surface which is formed with a dispersion pattern dispersing the light received from the first side, and a top surface which transmits the light towards the liquid crystal panel, wherein the top surface of the light guiding plate comprises a lenticular lens having a length which is parallel to a main incidence direction of the light generated by the first light source unit, wherein the dispersion pattern comprises a plurality of grooves, with a groove of the plurality of grooves having a shape with a first size which is parallel to the main incidence direction of the first light source unit and a second size which is perpendicular to the main incidence direction of the first light source unit, and wherein the first size is larger than the second size.

According to another aspect of an exemplary embodiment, there is provided a scanning backlight unit which may include: a light source unit having plural light sources which emit light in a main incidence direction; a control unit which controls the plural groups of light sources; and a light guiding plate having a bottom surface formed with a dispersion pattern dispersing the light received from the light source unit, wherein the dispersion pattern comprises a plurality of grooves, and each groove among the plurality of grooves has a ratio of depth to width of 0.8 or more.

A distribution density of grooves among the plurality of grooves increases with distance from a first light source unit from among the plurality of light source unit toward a center of the liquid crystal panel.

According to another aspect of an exemplary embodiment, there is provided a scanning backlight unit which may include: a light source unit having plural groups of light sources which emit light in a main incidence direction; a control unit which controls the plural groups of light sources; and a light guiding plate having a bottom surface formed with a dispersion pattern dispersing the light received from the light source unit, wherein the dispersion pattern includes a plurality of grooves, with a groove of the plurality of grooves having a shape with a first size parallel to the main incidence direction and a second size perpendicular to the main incidence direction, and wherein the first size is larger than the second size.

Each groove among the plurality of grooves may have a ratio of depth to width of 0.8 or more.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION

Figure 1:
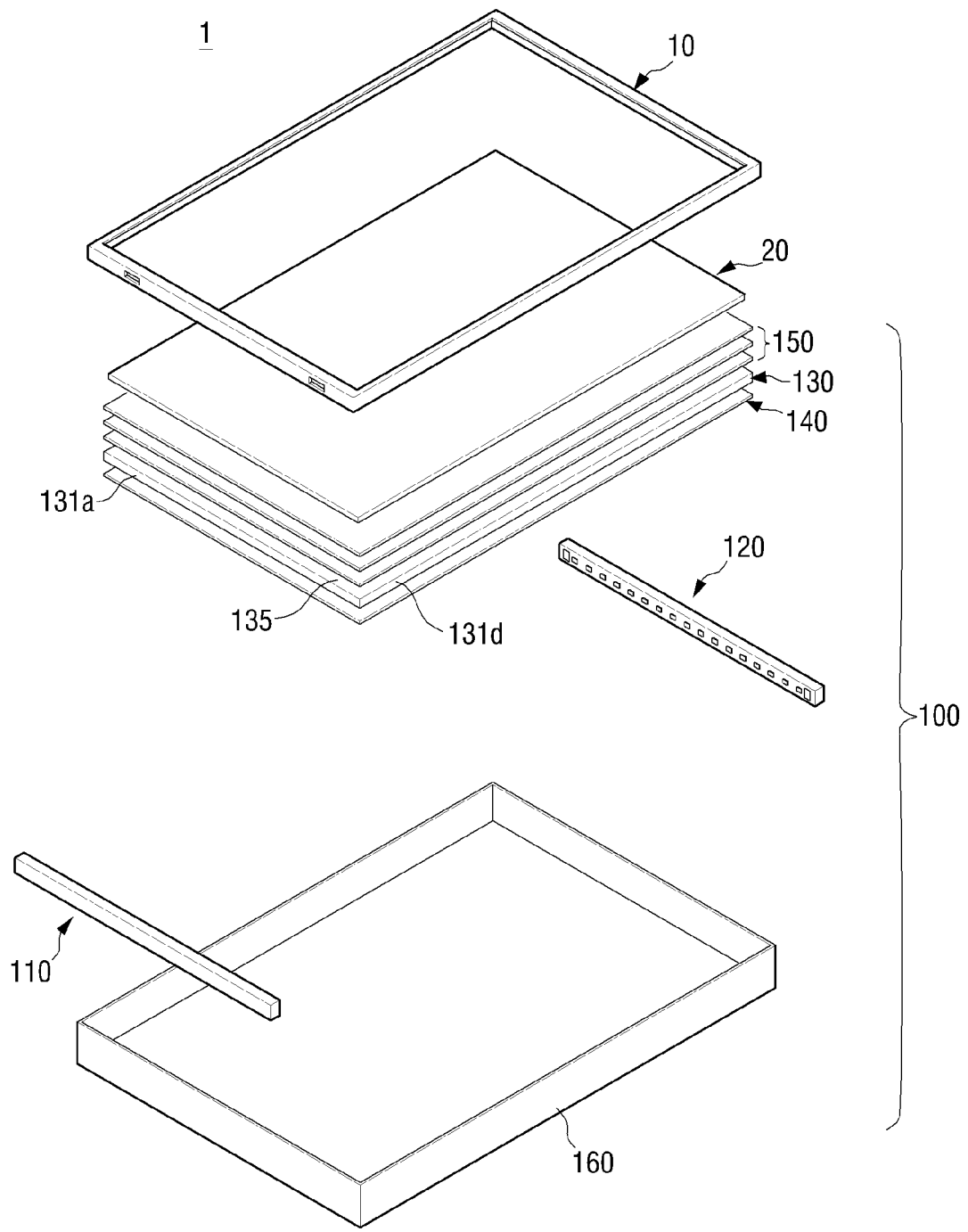
FIG. 1 schematically illustrates an exploded perspective view of a liquid crystal display according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding. Also, well-known functions or constructions are not described in detail since they would tend to provide the reader with unnecessary detail.

FIG. 1 is a schematically exploded perspective view of a liquid crystal display according to an exemplary embodiment.

The liquid crystal display 1 may include a front case 10, a liquid crystal panel 20, and a scanning backlight unit 100.

The front case 10 forms an appearance of the liquid crystal display 1 in combination with the scanning backlight unit 100.

The liquid crystal panel 20 displays images by receiving the light from the scanning backlight unit 100. As those skilled in the art may easily understand the specific structure of the liquid crystal panel 20, its detailed description is omitted.

The scanning backlight unit 100 supplies the light to the liquid crystal panel 20 and may include first and second light source units 110 and 120, a light guiding plate 130, a reflected sheet 140, an optical sheet 150, and a frame 160.

The first and second light source units 110 and 120 generate light by receiving power from the power source (not shown).

The light guiding plate 130 supplies the light which is generated by the first and second light source units 110 and 120 to liquid crystal panel 20. The light guiding plate 130 is a flat plate shaped member which keeps an even thickness and may be composed of a transparent acrylic material, a polymethylmethacrylate (PMMA), a plastic, or a glass etc.

The reflected sheet 140 is placed under the light guiding plate 130 and reflects the light which is projected downwards the light guiding plate 130 to the liquid crystal panel 20.

The optical sheet 150 is placed above the light guiding plate 130 and diffuses and concentrates the light which heads towards the liquid crystal panel 20. The optical sheet 50 may be composed of a diffusion sheet and a prism sheet.

As those skilled in the art may easily understand about the specific structure of the reflected sheet 140 and the optical sheet 150, the detailed descriptions thereof are omitted.

The frame 160 accommodates components of the scanning backlight unit 100 such as the first and second light source units 110 and 120, the light guiding plate 130, the reflected sheet 140, and the optical sheet 150.

Hereinafter, the more details of the first and second light source units 110 and 120 and the light guiding plate 130 are presented with reference to FIGS. 2 to 5.

Figure 2:
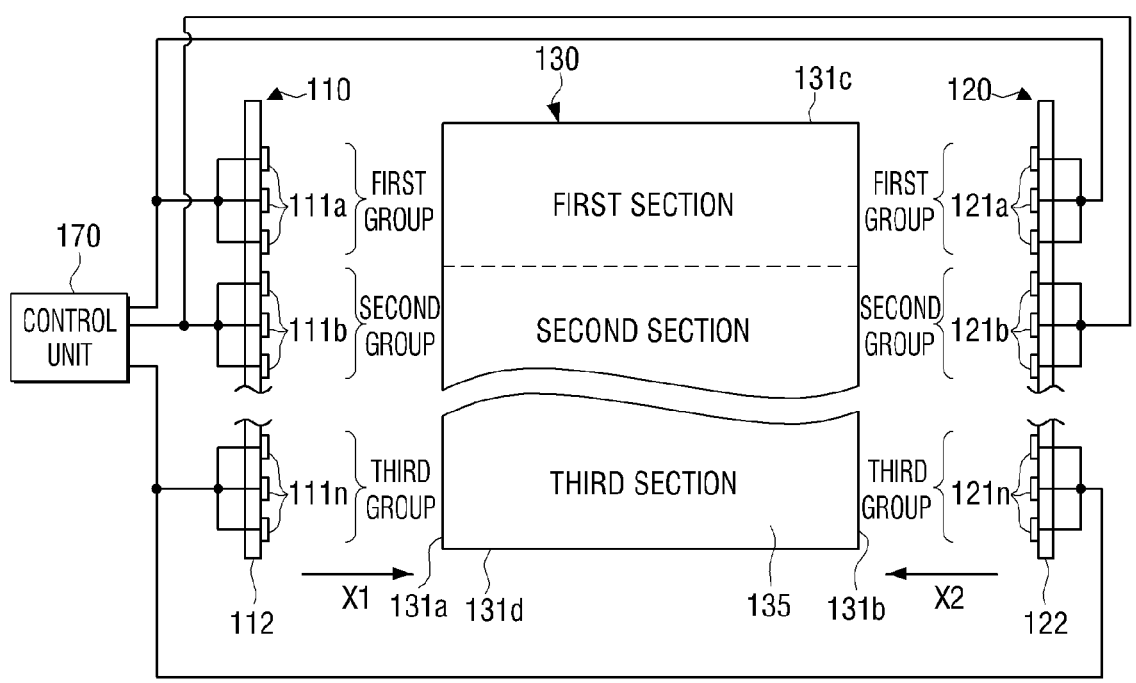
FIG. 2 schematically illustrates a disposition of first and second light source units and a light guiding plate.
Figure 3:
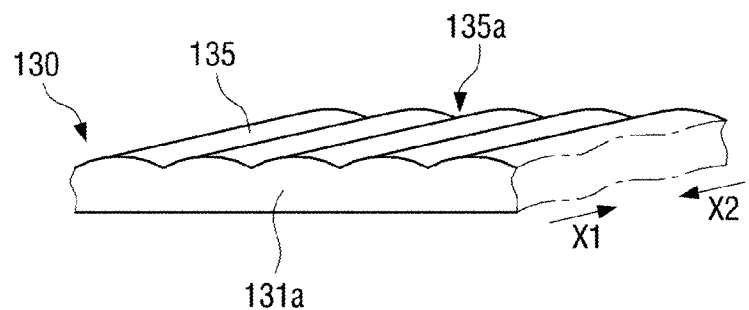
FIG. 3 schematically illustrates a perspective view of a light guiding plate.
Figure 4:
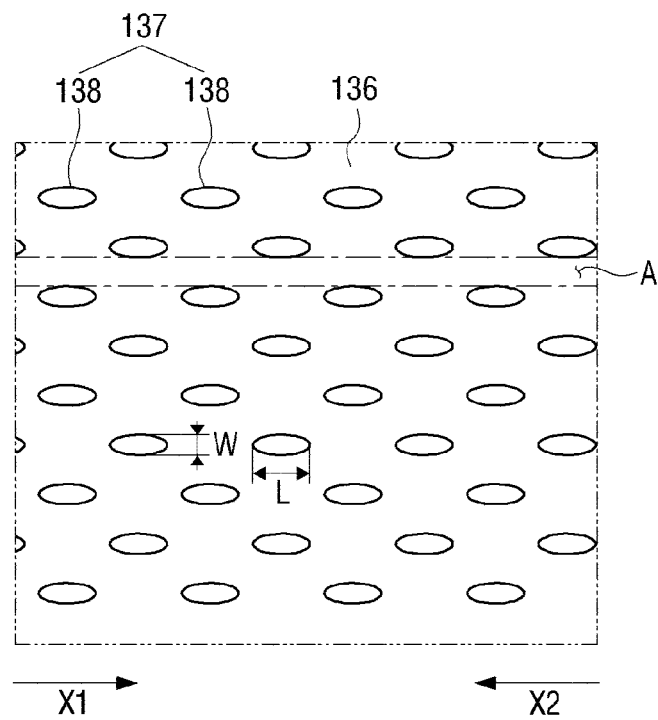
FIG. 4 illustrates a part of a bottom surface of a light guiding plate.
Figure 5:
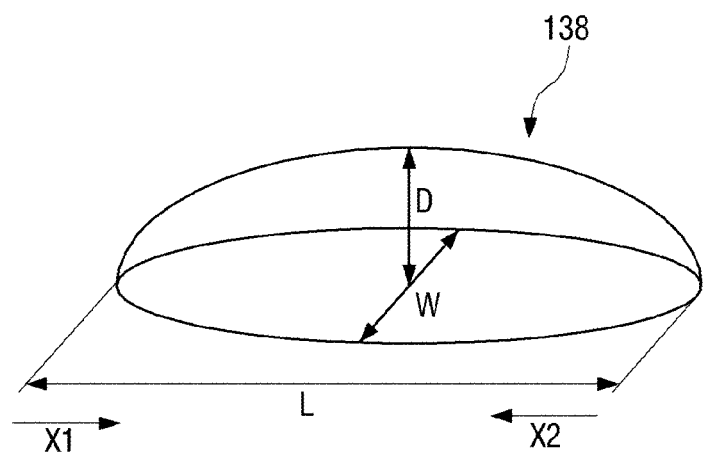
FIG. 5 is an enlarged groove formed at a bottom surface of a light guiding plate.

FIG. 2 schematically shows a disposition of the first and second light source units 110 and 120 and the light guiding plate 130. FIG. 3 schematically shows a perspective view of the light guiding plate 130. FIG. 4 shows a part of the bottom of the light guiding plate 130. FIG. 5 shows an enlarged groove which is formed at a bottom surface of the light guiding plate 130.

As illustrated in FIG. 2, the first light source unit 110 includes plural first light emitting diodes 111a, 111b and 111n and a first circuit board 112 on which the plural light emitting diodes 111a, 111b, and 111n are installed. The second light source unit 120 includes plural second light emitting diodes 121a, 121b, and 121n and a second circuit board 122 on which the plural light emitting diodes 121a, 121b, and 121n are installed. By the use of the plural light emitting diodes 111a, 111b, 111n, 121a, 121b, and 121n to the first and second light source units 110 and 120, the power consumption may be reduced.

The first light source unit 110 is placed in front of a first side 131a of the light guiding plate 130. The light generated by the first light source unit 110 is projected to the first side 131a of the light guiding plate 130 along the main incidence direction X1. The second light source unit 120 is placed in front of a second side 131b which is located at an opposite side of the first side 131a of the light guiding plate 130. The light generated by the second light source unit 120 is projected to the second side 131b of the light guiding plate 130 along the main incidence direction X2. In FIG. 2, the first and second light source 110 and 120 are drawn as if it is placed apart from the first and second sides 131a and 131b of the light guiding plate 130, however, it is required to notice that the first and second light source 110 and 120 are actually placed nearby the first and second side 131a and 131b of the light guiding plate 130.

The incidence light towards the first and second sides 131a and 131b of the light guiding plate 130 is projected to a top surface 135 of the light guiding plate 130 and headed to the liquid crystal panel 20. Thus, the scanning backlight unit 100 according to the exemplary embodiment may thin the liquid crystal display 1 as the first and second light source units 110 and 120 are embodied by the edge-lit backlight units placed at the first and second sides 131a and 131b of the light guiding plate.

Third and fourth sides 131c and 131d which are adjacent to the first and second sides 131a and 131b of the light guiding plate 130 are not mounted with the light source units. In other words, only the first and second light source units 110 and 120 are mounted closely to the first and second sides 131a and 131b which are relatively short in length among the four sides 131a-131d of the light guiding plate 130. Therefore, the size of the liquid crystal display may be reduced even more.

In this specification, the distance between the first and second sides 131a and 131b of the light guiding plate 130 is called as the length of the light guiding plate 130, and the distance between the third and fourth sides 131c and 131d of the light guiding plate 130 is called as the height of the light guiding plate 130.

The first and second light source units 110 and 120 are separated into plural groups which may be operated 11ently. A control unit 170 controls the operation of each group of the first and second light source units 110 and 120. By the control unit 170, each group of the first and second light source units 110 and 120 may generate the light independently. For example, if the first group of the first and second light source units 110 and 120 of the control unit 170 is activated and other groups are deactivated, only the light emitting diodes 111a and 121a relevant to the first group of the first and second light source units 110 and 120 generate the light and the light emitting diodes 111b, 111n, 121b and 121n relevant to the other groups of the first and second light source units 110 and 120 do not operate. In this case, only the first section of the light guiding plate 130 supplies the light to the liquid crystal panel 20. In addition, if the control unit 170 activates the second group of the first and second light source units 110 and 120 of the control unit 170 and deactivates the other groups, only the light emitting diodes 111b and 121b relevant to the second group of the first and second light source units 110 and 120 generate the light and the light emitting diodes 111a, 111n, 121a and 121n relevant to the other groups of the first and second light source units 110 and 120 do not operate. In this case, only the second section of the light guiding plate 130 supplies the light to the liquid crystal panel 20.

By activating and deactivating each group of the first and second light source units 110 and 120 in serial order, the control unit 170 may embody a scanning operation. By this way, the motion blur which may occur during the reproduction of the video images may be prevented. As those skilled in the art may understand easily about the specific operation ways of the control unit 170 to embody the scanning operation, the detailed description thereof is omitted.

In FIG. 2, three light emitting diodes are allotted to each group of the first and second light source units 110 and 120, however, it has to be understood that it only aims to clarify the drawings. Substantially, the number of the light emitting diodes which is allotted to each group of the first and second light source units 110 and 120 is more than the above.

When the first group of the first and second light source units 110 and 120 is activated, it is ideal that only the first section of the light guiding plate 130 supplies the light to the liquid crystal panel 20. However, practically, due to the dispersion phenomenon in the light guiding plate 130, the light generated by the light emitting diodes 111a and 121a relevant to the first group of the first and second light source units 110 and 120 is partially spread to the other sections of the light guiding plate 130. As a result, other than the first section of the light guiding plate 130 also supplies few light to the liquid crystal panel 20. This kind of phenomenon occurs equally even if the other groups instead of the first group of the first and second light source units 110 and 120 are activated. Therefore, on the images which are reproduced by the liquid crystal display 1, crosstalk may occur. To prevent this, it is desirable to improve the straightness of the incidence light towards the first and second sides 131a and 131b of the light guiding plate 130.

Referring to FIG. 3, the top surface 135 of the light guiding plate 130 is formed with a lenticular lens 135a. The lenticular lens 135a may improve the straightness of the incidence light towards the first and second sides 131a and 131b of the light guiding plate 130 because a length of the lenticular lens 135a is formed in parallel to the main incidence direction X1 of the first light source 110 and the main incidence direction X2 of the second light source 120. In other words, the first and second sides 131a and 131b of the lenticular lens 135a are perpendicular to the main incidence direction X1 of the first light source 110 and the main incidence direction X2 of the second light source 120, however, a length of the lenticular lens 135a is parallel to the main incidence direction X1 of the first light source 110 and the main incidence direction X2 of the second light source 120. As a result, crosstalk which may occur during the scanning operation of the scanning backlight unit 100 may be prevented.

At a bottom surface 136 of the light guiding plate 130, a dispersion pattern 137 is formed as shown in FIG. 4. The incidence light towards the first and second sides 131a and 131b of the light guiding plate 130 is dispersed by the dispersion pattern 137 and passes through the top surface 135 of the light guiding plate 130, and then passes to the liquid crystal panel 20. In the exemplary embodiment, the dispersion pattern 137 includes plural grooves 138. The plural grooves 138 may be formed by laser engraving. A three-dimensional figure of any one among the plural grooves 138 is shown in FIG. 5.

In FIG. 4, a difference of the distribution density of the groove 138 is not shown since only a part of the bottom surface 136 of the light guiding plate 130 is illustrated. However, the distribution density of the groove 138 is substantially varied according to the position on the bottom surface 136 of the light guiding plate 130. In the exemplary embodiment, the distribution density of the groove 138 is increased as the groove recedes from the first and second light source units 110 and 120. That is, in a position near the first and second sides 131a and 131b of the light guiding plate 130, the distribution density of the grooves 138 is low and in the central part of the light guiding plate 130, the distribution density of the grooves 138 is high. The reason why the distribution density of the groove 138 is altered is to embody a constant illumination along the length direction of the light guiding plate 130.

As the amount of the incidence light from the first and second sides 131a and 131b of the light guiding plate 130 to the central part of the light guiding plate 130 is small, the amount of the emitting light from the central part of the light guiding plate 130 to the top surface of the light guiding plate 130 is reduced. As a result, if the distribution density of the groove 138 is maintained evenly, the illumination nearby the first and second sides 131a and 131b of the light guiding plate 130 becomes higher than the illumination at the central part of the light guiding plate 130. However, if the distribution density of the groove 138 which causes the dispersion at the central part of the light guiding plate 130 is raised, it may increase the amount of the light discharging from the central part of the light guiding plate 130 towards the top surface 135. With this, a steady illumination may be maintained along the length direction of the light guiding plate 130.

As it may be understood through FIGS. 4 and 5, the plural grooves 138 are formed at length along the main incidence directions X1 and X2 of the first and second light source units 110 and 120. In other words, the plural grooves 138 have a first size (L) in a direction parallel to the main incidence directions X1 and X2 of the first and second light source units 110 and 120 and a second size (W) in a direction perpendicular to the main incidence direction X1 and X2 of the first and second light source units 110 and 120. The first size (L) is larger than the second size (W). As used herein, the first size (L) represents a length of the groove, and the second size (W) represents a width of the groove. As the grooves 138 are formed at length along the main incidence direction X1 and X2 of the first and second light source units 110 and 120, a straightness of the light incident towards the first and second sides 131a and 131b of the light guiding plate 130 and may prevent crosstalk which may occur during a scanning operation of the scanning backlight unit 100.

In the exemplary embodiment, the exposed surface of the groove 138 has an oval shape. That is, the major axis of the oval is parallel to the main incidence direction X1 and X2 of the first and second light source units 110 and 120 and the minor axis of the oval is perpendicular to the main incidence direction X1 and X2 of the first and second light source units 110 and 120. However, this is merely an example, and if the grooves 138 may be formed at length along the main incidence direction X1 and X2 of the first and second light source units 110 and 120, the shape of the exposed surface of the grooves may be variously changed.

As the grooves 138 are formed at length along the main incidence direction X1 and X2 of the first and second light source units 110 and 120, a section (A) may occur where no grooves 138 are formed along the perpendicular direction against the main incidence of the first and second light source units 110 and 120. As the dispersion does not occur in this section (A), the illumination of the scanning backlight unit 100 may be deteriorated. In an exemplary embodiment, this may be resolved by adjusting the shape of the grooves 138.

Through various experimental results, it was observed that the depth (D) of the grooves 138 affects the illumination of the scanning backlight unit 100. That is, as the depth (D) of the groove 138 becomes deeper, the illumination of the scanning backlight unit 100 is increased. Some of the experimental results are described in more detail.

The following table shows a measured result of the decreasing rate of the illumination of the scanning backlight unit 100 and the scanning efficiency for the cases of differing the shape of the grooves 138.

TABLE 1

|  | Case 1 | | Case 2 | |
| --- | --- | --- | --- | --- |
| Size (μm) | W | D | W | D |
|  | 350 | 90 | 140 | 110 |
| D/W | 0.3 | | 0.8 | |
| decreasing rate of illumination | 0% | | 0% | |
| Scanning efficiency | 40% | | 59% | |

In the above table, W represents the width of the grooves 138, D represents the depth of the grooves 138. To measure the decreasing rate of the illumination, the plural grooves 138 are formed at length along a direction perpendicular to the main incidence direction X1 and X2 of the first and second light source units 110 and 120. The decreasing rate of the illumination of each case represents how much the illumination of each case is reduced compared to the illumination of the standard case. In the above table, the scanning efficiency represents how much the brightness of an area nearby this specific section is reduced compared to the brightness of the specific section which remains in an on state when only the specific section of the light guiding plate 130 remains on state. This means that as the scanning efficiency becomes higher, the straightness of the incidence light to the first and second sides 131a and 131b of the light guiding plate 130 gets better.

As it may be observed in the above table, if the depth (D) of the groove 138 exceeds 90 μm or more, the illumination decreasing hardly occurs compared to the standard case. If the depth (D) of the groove 138 is less than 90 μm, the illumination decreasing occurs. Accordingly, it is desirable to keep the depth (D) of the groove 138 to be 90 μm at least.

Figure 6:
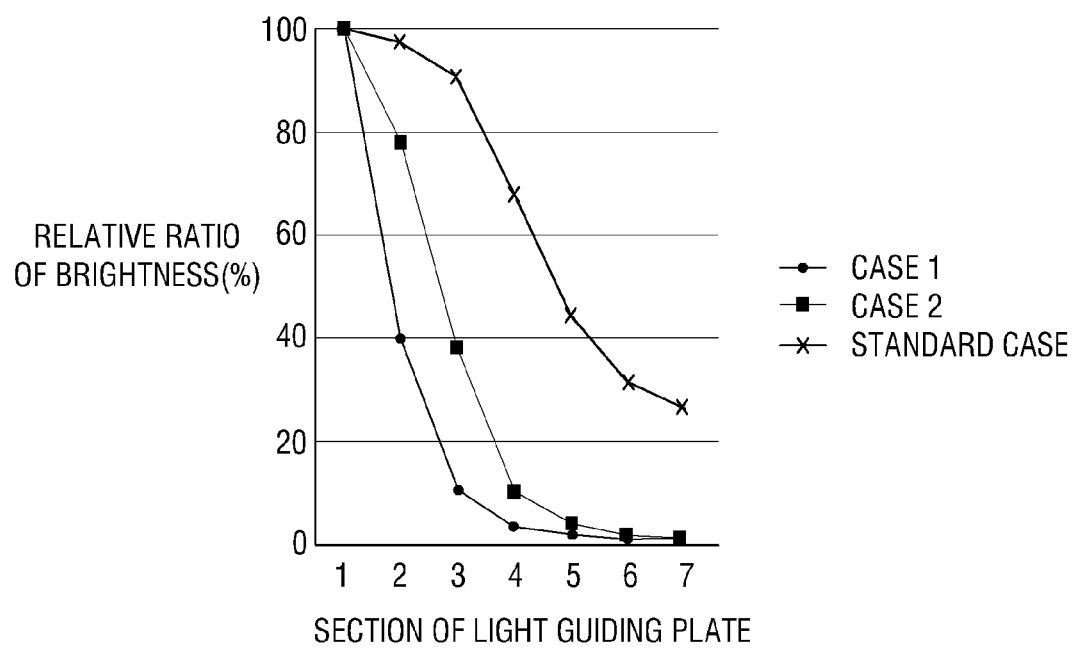
FIG. 6 is a graph showing a relative ratio of brightness measured at each section of a light guiding plate when a first group of the first and second light source units is activated.

It is noticed in case 2 that the width (W) of the groove 138 is reduced compared to case 1, and the scanning efficiency of case 2 is higher than the scanning efficiency of case 1. Accordingly, in case 2, crosstalk which may occur during the scanning operation of the scanning backlight unit 100 may be refrained considerably. Thus, it is known that the width (W) of the groove 138 influences the scanning efficiency. That is, as the width (W) of the groove 138 gets narrower, the light spreading phenomenon from a specific section of the light guiding plate 130 towards adjacent to the other section becomes restrained. With reference to FIG. 6, the above is described in more detail.

FIG. 6 illustrates a graph showing a relative ratio of the brightness measured at each section of the light guiding plate 130 when the first group of the first and second light source units 110 and 120 is activated. The brightness is measured from the central portion of the light guiding plate 130. In FIG. 6, the horizontal axis represents a section of the light guiding plate 130 and the vertical axis represents a relative ratio of the brightness. Here, the relative ratio of the brightness means a value that divides the brightness measured from each section of the light guiding plate 130 by the brightness measured from the first section of the light guiding plate 130.

As illustrated in FIG. 6, in the exemplary embodiment, the light guiding plate 130 is divided into 7 sections. However, this is merely an example. It should be understood that the light guiding plate 130 may be divided in various ways.

In FIG. 6, although the first group of the first and second light source units 110 and 120 is activated, considerably high brightness is measured from the second and third sections of the light guiding plate 130 in the standard case. This means that the most of the light in the first section of the light guiding plate 130 was spread to the second and third sections of the light guiding plate 130. Accordingly, in the standard case, crosstalk may occur during the scanning operation of the scanning backlight unit 100.

However in cases 1 and 2, it may be checked that the brightness at the second and third sections of the light guiding plate 130 is considerably reduced. This means that as the grooves 138 are formed at length along the main incidence direction X1 and X2 of the first and second light source units 110 and 120, the straightness of the incidence light towards the first and second sides 131a and 131b of the light guiding plate 130 is improved. Particularly, in case 2 where the width (W) of the groove 138 is reduced compared to case 1, the brightness of the second section of the light guiding plate 130 is reduced about 60% in comparison with the brightness of the first section. Therefore, in case 2, crosstalk which may occur during the scanning operation of the scanning backlight unit 100 may be significantly controlled.

Thus, the depth (D) of the groove 138 affects the illumination, and the width (W) of the groove 138 affects the straightness of the light or the scanning efficiency. If a ratio of the depth (D) of the groove 138 in relation to the width (W) of the groove 138 is 0.8 or more, both the illumination and the scanning efficiency of the scanning backlight unit 100 may reach a satisfactory level. This means that crosstalk occurrence may be controlled without reducing the illumination of the scanning backlight unit 100.

It has to be understood that the width (W) and the depth (D) of the groove 138 may be altered depending on the position at the bottom surface 136 of the groove 138. That is, the distribution density of the groove 138 is altered according to the position at the bottom surface 136 of the light guiding plate 130, and similarly, the illumination and the scanning efficiency of the scanning backlight unit 100 may be optimized by modulating the width (W) and the depth (D) of the groove 138.

Figure 7:
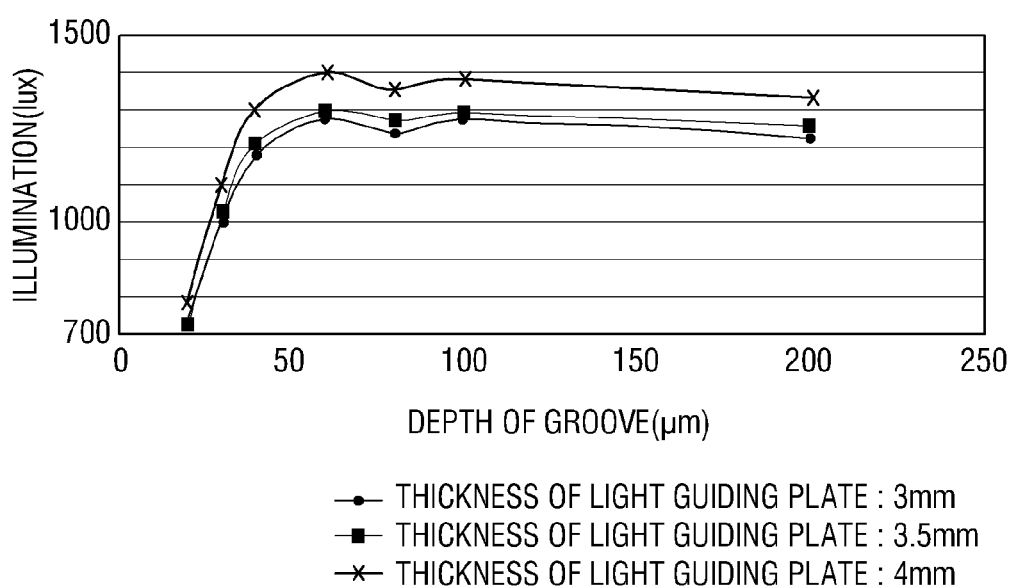
FIG. 7 is a graph showing a measured result of an illumination of a scanning backlight unit according to an alternation of the depth of the groove in relation to the light guiding plate having a different thickness.

FIG. 7 illustrates a graph showing a measured result of an illumination of the scanning backlight unit 100 according to an alteration of the depth (D) of the groove 138 in relation to the light guiding plate 130 having a different thickness.

As illustrated in FIG. 7, it may be understood that even if the thickness of the light guiding plate 130 is changed, the influence of the depth (D) of the groove 138 on the illumination of the scanning backlight unit 100 is not changed much. That is, regardless of the thickness difference of the light guiding plate 130, as the depth (D) of the groove 138 becomes deeper, the illumination of the scanning backlight unit 100 is increased, and if the depth (D) of the groove 138 is deeper than a preset depth, the illumination of the scanning backlight unit 100 does not change much. Therefore, the way of improving the illumination and the scanning efficiency of the scanning backlight unit 100 by adjusting the width (W) and the depth (D) of the groove 138 may be applied equally to the case of altering the thickness of the light guiding plate 130.

Figure 8:
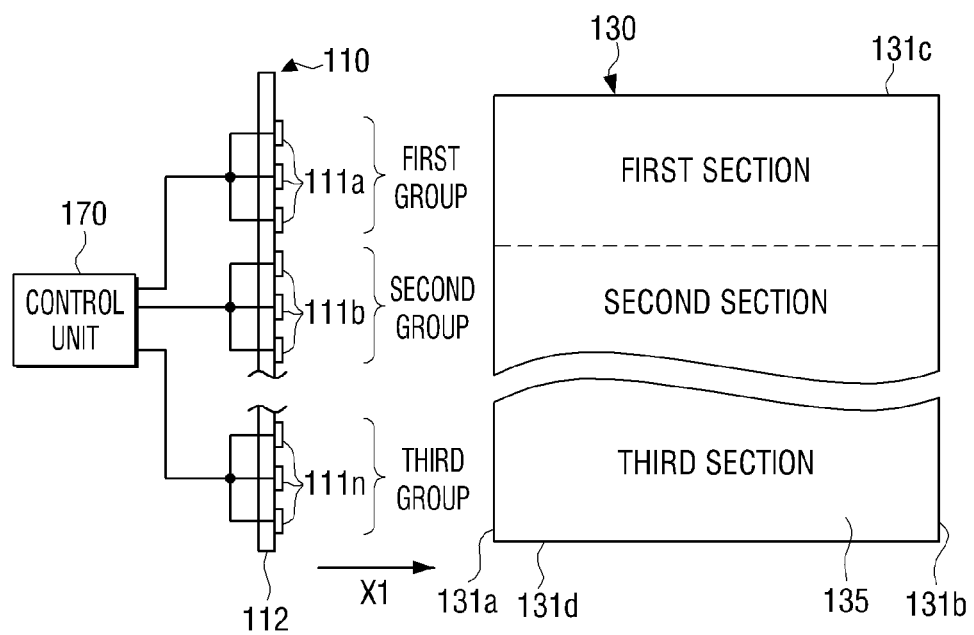
FIG. 8 schematically illustrates a scanning backlight unit according to another embodiment.

FIG. 8 schematically illustrates a scanning backlight unit 100a according to another embodiment. As the same reference numbers are given to the components which function equally as in the antecedent embodiment, so the detailed descriptions thereof are omitted.

The differences between the scanning backlight unit 100a of FIG. 8 and the scanning backlight unit 100 according to the antecedent embodiment is that the second light source unit 120 is omitted. By the omission of the second light source unit 120, the size of the scanning backlight unit 100a may be reduced and thus, the liquid crystal display 1 may be more miniaturized.

In FIG. 8, as the second light source unit 120 is omitted, the distribution density of the groove 138 formed at the bottom surface 136 of the light guiding plate 130 is changed from the antecedent embodiment. In FIG. 8, the distribution density of the groove 138 increases as it distances from the first light source unit 100. That is, the distribution density of the groove 138 adjacent to the second side 131b of the light guiding plate 130 is higher than the distribution density of the groove 138 adjacent to the first side 131a of the light guiding plate 130. As described above, it is to embody a preset illumination along the length direction of the light guiding plate 130.

Figure 9:
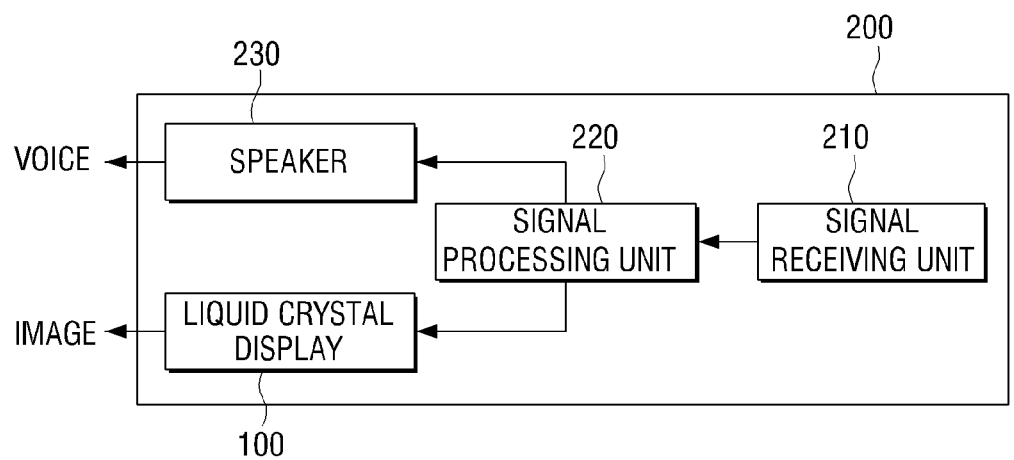
FIG. 9 schematically illustrates a television adopted with the liquid crystal display according to the exemplary embodiment.

FIG. 9 schematically illustrates a television 200 which is adopted with the liquid crystal display 100 according to an exemplary embodiment. This kind of the television 200 includes a signal receiving unit 210, a signal processing unit 220, a speaker 230, and the liquid crystal display 100.

The signal receiving unit 210 receives an external signal which includes image information or voice information. The external signal may be a broadcasting signal sent from the broadcasting station or an output signal transmitted from peripheral devices such as a DVD player of a PC. Therefore, the signal receiving unit 210 may include an antenna and a tuner which receives the broadcasting signal and include a connector which receives the output signal transmitted from a DVD player or a PC etc.

The signal processing unit 220 conducts a signal process for the external signal received through the signal receiving unit 210 and generates an image signal to show images through the liquid crystal display 100 and a voice signal to output voice through the speaker 230.

The speaker 230 receives a voice signal which is generated by the signal processing unit 220 and outputs the voice.

The liquid crystal display 100 receives an image signal which is generated by the signal processing unit 220 and displays the same in visual. As described above, the liquid crystal display 100 according to the exemplary embodiment may control the motion blur and the crosstalk and thus may provide much clearer definition. Therefore, such the liquid crystal display 100 may be adopted to a three-dimensional television.

FIG. 9 illustrates that the liquid crystal display 100 is applied to the television 200, however, this is merely an example. It has to be understood that the liquid crystal display 100 according to the exemplary embodiment may be applied in various fields such as a computer monitor, an electric sign board, and a mobile equipment.

The foregoing exemplary embodiments and advantages are merely exemplary and are not to be construed as limiting the present invention. Other exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A scanning backlight unit comprising:
   a first light source unit including plural groups of first light sources, the plural groups of first light sources being configured to generate light independently;
   a control unit configured to control the plural groups of the first light sources; and
   a light guiding plate configured to transmit the light generated from the first light source unit to a liquid crystal panel,
   wherein the light guiding plate comprises:
      a first side configured to receive the light generated by the first light source unit;
      a bottom surface including a dispersion pattern configured to disperse the light received from the first side; and
      a top surface configured to transmit the light towards the liquid crystal panel,
   wherein the top surface of the light guiding plate comprises a lenticular lens having a length which is parallel to a main incidence direction of the light generated by the first light source unit,
   wherein the dispersion pattern comprises a plurality of grooves, with a groove of the plurality of grooves having a shape that includes a curved cross section, a first dimension in a first direction that is parallel to the main incidence direction of the first light source unit and a second dimension in a second direction which is perpendicular to the main incidence direction of the first light source unit, and
   wherein the first dimension greater than the second dimension.

2. The backlight unit as claimed in claim 1, wherein a ratio of a depth of the groove to the second dimension of the groove is at least 0.8.

3. The backlight unit as claimed in claim 1, wherein a depth of the groove is at least 90 µm.

4. The backlight unit as claimed in claim 1, wherein a portion of the groove is in an oval shape having a major axis parallel to the main incidence direction of the first light source unit and a minor axis perpendicular to the main incidence direction of the first light source unit.

5. The backlight unit as claimed in claim 1, wherein the first light sources of the first light source unit comprise a first plurality of light emitting diodes.

6. The backlight unit as claimed in claim 1, wherein a length of the first side of the light guiding plate is shorter than a length of a second side of the light guiding plate adjacent to the first side.

7. The backlight unit as claimed in claim 1, wherein a distribution density of grooves among the plurality of grooves increases with distance from the first light source unit.

8. The backlight unit as claimed in claim 1, wherein the groove is formed by a laser.

9. The backlight unit as claimed in claim 1, further comprising a second light source unit, which is at an opposite side of the first light source unit, and which includes plural groups of second light sources configured to generate light independently.

10. The backlight unit as claimed in claim 9, wherein the second light source unit comprises a second plurality of light emitting diodes.

11. The backlight unit as claimed in claim 9, wherein a distribution density of grooves among the plurality of grooves increases with distance from the first light source unit and the second light source unit.

12. A liquid crystal display comprising a scanning backlight unit according to claim 1.

13. A television comprising the liquid crystal display according to claim 12.

14. A scanning backlight unit comprising:
   a light source unit including plural light sources, the plural light sources being configured to emit light in a main incidence direction;
   a control unit configured to control the plural groups of light sources; and
   a light guiding plate including a bottom surface that includes a dispersion pattern configured to disperse the light received from the light source unit,
   wherein the dispersion pattern comprises a plurality of grooves, and each groove among the plurality of grooves has a ratio of depth to width of 0.8 or more.

15. The scanning backlight unit according to claim 14, wherein a distribution density of grooves among the plurality of grooves increases with distance from the light source unit toward a center of the liquid crystal panel.

16. A scanning backlight unit comprising:
   a light source unit including plural groups of light sources, the plural groups of light sources being configured to emit light in a main incidence direction;
   a control unit which controls the plural groups of light sources; and
   alight guiding plate including a bottom surface that includes a dispersion pattern configured to disperse the light received from the light source unit,
   wherein the dispersion pattern includes a plurality of grooves, with a groove of the plurality of grooves having a shape that includes a curved cross section, a first dimension in a first direction that is parallel to the main incidence direction, and a second dimension in a second direction that is perpendicular to the main incidence direction, and
   wherein the first dimension is greater than the second dimension.

17. The scanning backlight unit according to claim 16, wherein each groove among the plurality of grooves has a ratio of depth to width of 0.8 or more.

* * * * *